United States Patent
Asada et al.

(10) Patent No.: US 12,553,563 B2
(45) Date of Patent: Feb. 17, 2026

(54) REPAIR JOINT DEVICE AND METHOD OF ASSEMBLING THE SAME

(71) Applicant: THE VICTAULIC COMPANY OF JAPAN LIMITED, Tokyo (JP)

(72) Inventors: Shinichi Asada, Kobe (JP); Masao Naito, Kobe (JP)

(73) Assignee: THE VICTAULIC COMPANY OF JAPAN LIMITED, Tokyo (JP)

( * ) Notice: Subject to any disclaimer, the term of this patent is extended or adjusted under 35 U.S.C. 154(b) by 469 days.

(21) Appl. No.: 18/016,591

(22) PCT Filed: Jul. 17, 2020

(86) PCT No.: PCT/JP2020/027768
§ 371 (c)(1),
(2) Date: Jan. 17, 2023

(87) PCT Pub. No.: WO2022/014029
PCT Pub. Date: Jan. 20, 2022

(65) Prior Publication Data
US 2023/0279983 A1   Sep. 7, 2023

(51) Int. Cl.
*F16L 21/06*   (2006.01)
*F16L 13/02*   (2006.01)
*F16L 55/17*   (2006.01)

(52) U.S. Cl.
CPC ....... *F16L 55/1715* (2013.01); *F16L 13/0236* (2013.01)

(58) Field of Classification Search
CPC ... F16L 55/1715; F16L 27/1133; F16L 25/06; F16L 55/178
USPC ......................................................... 138/99
See application file for complete search history.

(56) References Cited

U.S. PATENT DOCUMENTS

| 1,568,268 A | * | 1/1926 | Clark | F16L 55/172 |
| | | | | 285/337 |
| 4,603,893 A | * | 8/1986 | Takahashi | F16L 21/06 |
| | | | | 285/342 |
| 5,345,972 A | * | 9/1994 | Goglio | F16L 55/175 |
| | | | | 138/167 |

FOREIGN PATENT DOCUMENTS

| CN | 210413274 U | 4/2020 |
| JP | H05-118491 A | 5/1993 |
| JP | H06-11092 A | 1/1994 |
| JP | 2000-179781 A | 6/2000 |
| JP | 2012-037041 A | 2/2012 |
| JP | 2016-11724 A | 1/2016 |

(Continued)

OTHER PUBLICATIONS

Sep. 24, 2020 Search Report issued in International Patent Application No. PCT/JP2020/027768.

(Continued)

*Primary Examiner* — Kenneth Rinehart
*Assistant Examiner* — Haotian Lu
(74) *Attorney, Agent, or Firm* — Oliff PLC (57) ABSTRACT

A repair joint device capable of joining by welding divided housings and of facilitating the welding operation; and includes a plurality of circumferentially divided housings, wherein each divided housing has a divided sleeve, a pair of end plates provided on both end portions of the divided sleeve, and a seal accommodation projection provided on each end plate. A projection-free area is formed between the seal accommodation projections. An auxiliary projection device is provided on the projection-free area.

10 Claims, 9 Drawing Sheets

(56) References Cited

FOREIGN PATENT DOCUMENTS

| | | | |
|---|---|---|---|
| JP | 2017133589 A | * | 8/2017 |
| WO | 2015/084517 A1 | | 6/2015 |

OTHER PUBLICATIONS

Jan. 10, 2025 Office Action issued in Chinese Patent Application No. 202080101426.X.
Sep. 19, 2024 Office Action issued in Indonesian Patent Application No. P00202213955.

* cited by examiner

REPAIR JOINT DEVICE AND METHOD OF ASSEMBLING THE SAME

TECHNICAL FIELD

The present disclosure relates to a repair joint device, which is installed on a leakage area between pipes through which a liquid flows and includes circumferentially divided housings, and a method of assembling the same. In particular, the present disclosure relates to a repair joint device capable of joining the respective divided housings by welding and of facilitating the welding process, and a method of assembling the same.

BACKGROUND ART

After a water pipe or an industrial pipe has been buried, it may crack or its weld may deteriorate due to changes over time and/or ground deformation. Liquid in the pipe leaks in this case.

Installing a repair joint device that surrounds the entire joint to be repaired including a leakage area is considered in case of liquid leakage from a pipe.

A repair joint device that surrounds a first pipe and a second pipe constitute a pipe from the outside of the pipe and includes multiple divided housings is known as an example of such a repair joint device.

The repair joint device of this type includes the multiple circumferentially divided housings, e.g., two divided housings.

If the respective housings can be joined to each other by welding during assemblage, an overall structure of the repair joint device can be simplified and the use of such a repair joint device can be facilitated.

Patent Document 1: JP H5-118491 A
Patent Document 2: JP 2012-37041 A

DISCLOSURE OF THE INVENTION

The present disclosure has been made in consideration of these points. The object of the preset disclosure is to provide a repair joint device and a method of assembling the same which are capable of joining by welding respective divided housings constituting the repair joint device, and of facilitating the welding operation.

The present disclosure is a repair joint device comprising a plurality of circumferentially divided housings surrounding a pipe from the outside, the divided housings being joined to each other by welding through a joint surface, wherein: each divided housing has a divided sleeve surrounding the pipe from the outside, a pair of end plates provided on both axial end portions of the divided sleeve, and a circumferentially extending seal accommodation projection provided on an axially outer surface of each end plate to form a seal accommodation space between the divided housing and the pipe; each seal accommodation projection does not extend up to the joint surface; a projection-free area is formed between the seal accommodation projection of one of the pair of adjacent divided housings and the seal accommodation projection of the other of the pair of adjacent divided housings; and an auxiliary projection device is removably provided on the projection-free area, the auxiliary projection device forming an additional seal accommodation space between the auxiliary projection device and the pipe.

The present disclosure is the repair joint device, wherein the auxiliary projection device has an auxiliary projection fitted in the projection-free area, and an auxiliary fixing portion for holding the auxiliary projection, the auxiliary fixing portion being fixed on the seal accommodation projection of the one divided housing and the seal accommodation projection of the other divided housing.

The present disclosure is the repair joint device, wherein a seal retainer ring fitting for holding a seal ring attached to the seal accommodation space and the additional seal accommodation space is provided on the seal accommodation projection of each divided housing.

The present disclosure is the repair joint device, wherein the seal ring includes a pair of divided seal rings that are divided through contact surfaces.

The present disclosure is a method of assembling a repair joint device comprising a plurality of circumferentially divided housings surrounding a pipe from the outside, the divided housings being joined to each other by welding through a joint surface, the method comprising: preparing the plurality of divided housings each having a divided sleeve surrounding the pipe from the outside, a pair of end plates provided on both axial end portions of the divided sleeve, and a circumferentially extending seal accommodation projection provided on an axially outer surface of each end plate to form a seal accommodation space between the seal accommodation projection and the pipe, wherein the seal accommodation projection of each divided housing does not extend up to the joint surface; installing each divided housing around the pipe, wherein a projection-free area is formed between the seal accommodation projection of one of the pair of adjacent divided housings and the seal accommodation projection of the other of the pair of adjacent housings; joining the pair of divided housings by welding through the joint surface; removing a weld surplus remaining on the joint surface of the pair of divided housings; and providing an auxiliary projection device on the projection-free area, the auxiliary projection device forming an additional seal accommodation space between the auxiliary projection device and the pipe.

The present disclosure is the method of assembling a repair joint device, wherein the weld surplus remaining at least on portions corresponding to the projection-free area and the additional seal accommodation space of the joint surface of the pair of divided housings is removed.

The present disclosure is the method of assembling a repair joint device, further comprises fitting a seal ring in the seal accommodation space and the additional seal accommodation space of each divided housing, and providing a seal retainer ring fitting for holding the seal ring on the seal accommodation projection.

The present disclosure can simplify the overall structure and can improve the sealing performance.

MODE FOR CARRYING OUT THE INVENTION

Embodiment

A repair joint device according to an embodiment is described hereunder with reference to FIGS. 1 to 9.

Figure 1:
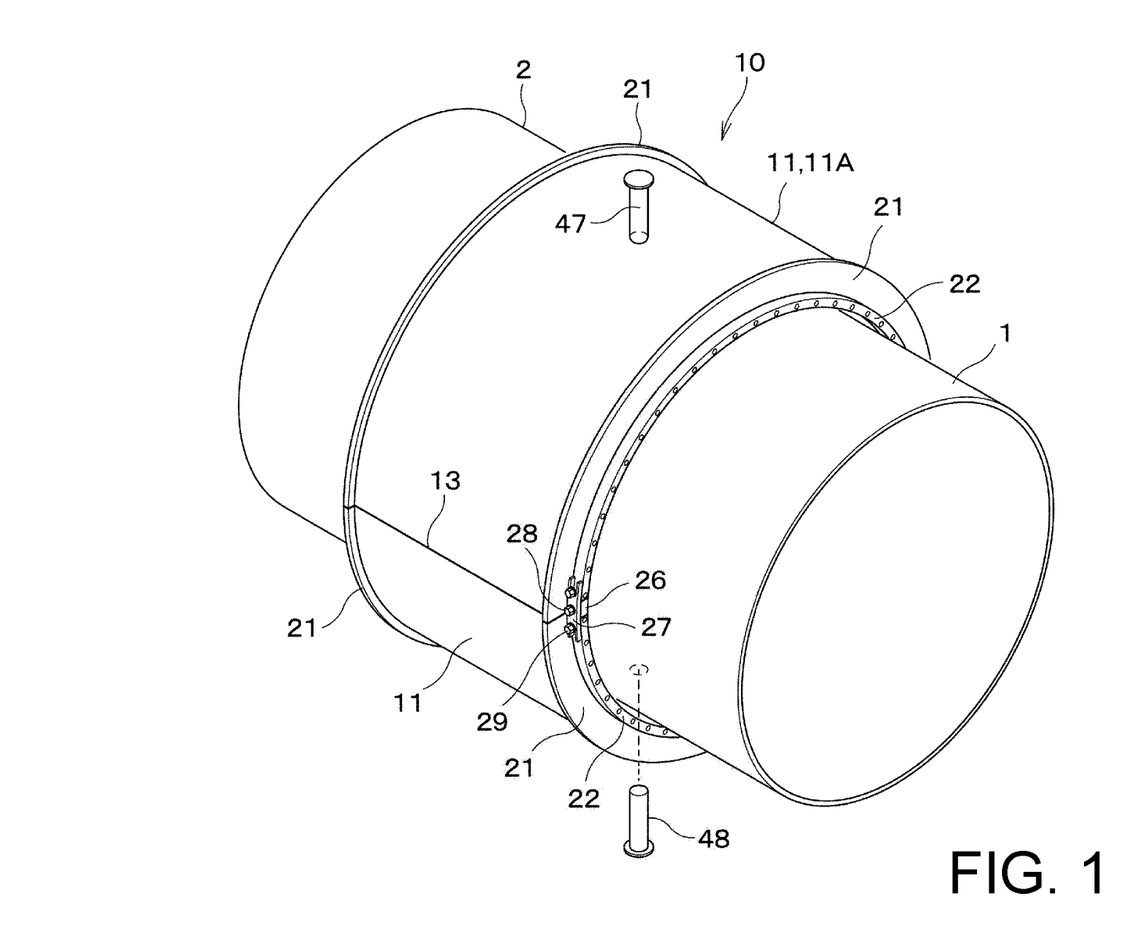
FIG. 1 is a perspective view showing a repair joint device according to an embodiment.
Figure 2:
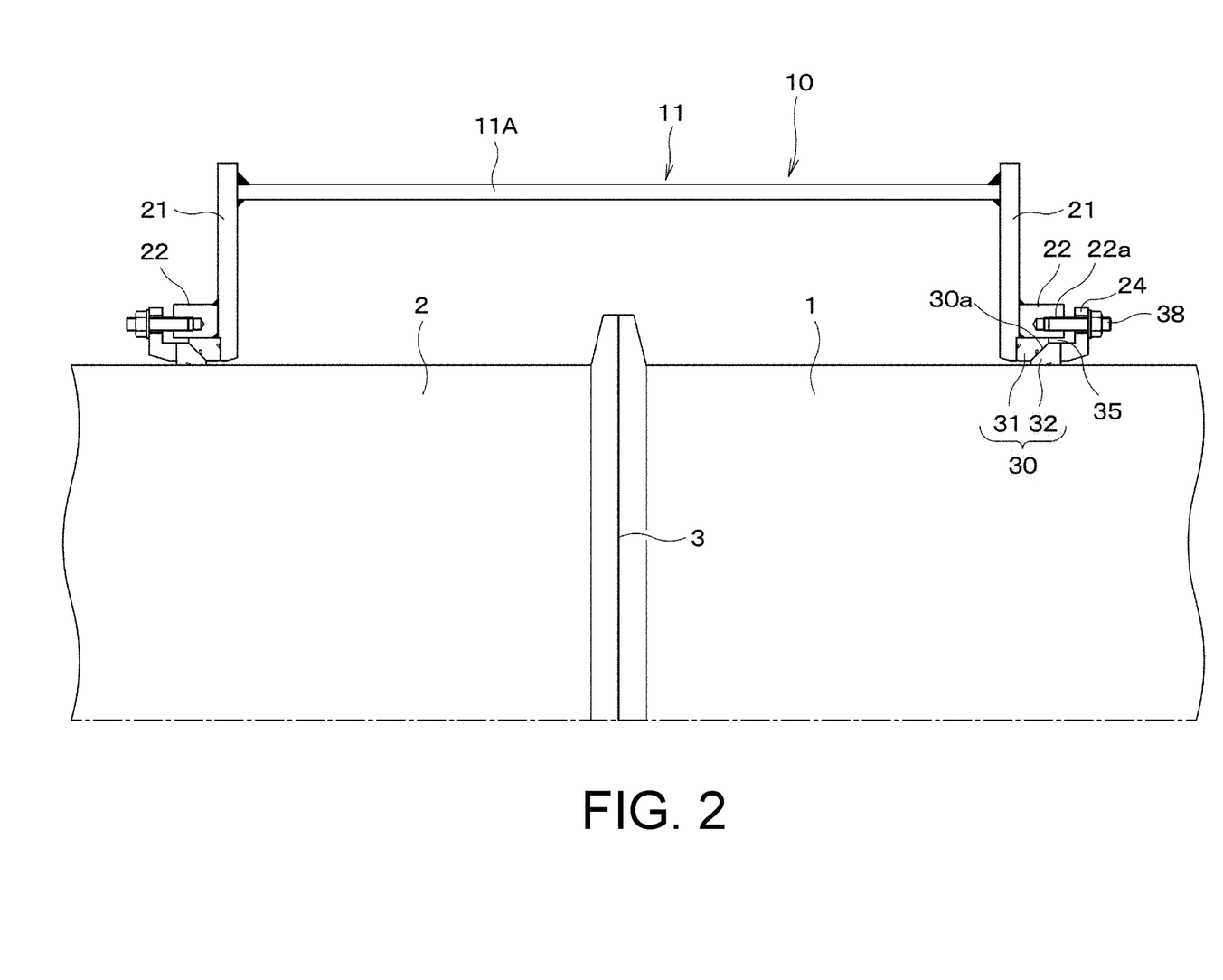
FIG. 2 is a side view showing the repair joint device.

As shown in FIGS. 1 and 2, a repair joint device 10 according to this embodiment surrounds from the outside of a cylindrical leakage pipe (first pipe) 1 having an axis passing through a center, and a cylindrical leakage pipe (second pipe) 2 having an axis passing through the center. The repair joint device 10 includes a plurality of divided housings, e.g., two divided housings 11, 11.

The two circumferentially divided housings 11, 11 are welded and joined to each other through a joint surface 13.

The upper divided housing 11 constitutes an upper half of the repair joint device 10, and the lower divided housing 11 constitutes a lower half of the repair joint device 10.

As further shown in FIGS. 1 and 2, each divided housing 11 comprises a semi-cylindrical divided sleeve 11A surrounding the first pipe 1 and the second pipe 2 from the outside, an end plate provided one axial end portion of the divided sleeve 11A on the first pipe 1 side, and an end plate 21 provided on the other axial end portion thereof on the second pipe 2 side.

The repair joint device 10 is mainly used for dealing with liquid leakage from a joint surface 3 between the first pipe 1 and the second pipe 2, but may be used for dealing with leakage caused by the damaged first pipe 1 or second pipe 2, for example. In this case, the repair joint device 10 is provided to surround the first pipe 1 or second pipe 2 from the outside.

As described above, a pair of the end plates 21, 21 are provided on both axial end portions of of each divided housing 11. A seal accommodation projection 22 is provided on an axially outer surface of each end plate 21, 21 to form a seal accommodation space 35 between the seal accommodation projection 22 and the first pipe 1 or second piper 2 corresponding to the axially outer surface of each end plate 21. The seal accommodation projection 22 is formed to circumferentially extend on the axially outer surface of each end plate 21, 21. A seal ring 30 described later is inserted into the seal accommodation space 35.

Each seal accommodation projection 22 does not extend up to the joint surface 13 between the divided housings 11. Thus, a projection-free areas 23, 23 are formed between the seal accommodation projection 22 of one (one divided housing) of the pair of adjacent divided housings 11 and the seal accommodation projection 22 of the other (the other divided housing) of the pair of adjacent divided housings 11. The projection-free areas 23, 23 formed between the seal accommodation projection 22 of the one divided housing 11 and the seal accommodation projection 22 of the other divided housing 11 comprise the projection-free area 23 of the one divided housing 11 and the projection-free area 23 of the other divided housing 11.

Due to the provision of the projection-free areas 23, 23 between the seal accommodation projections 22, 22 of the divided housings 11, 11, a welding operation of the divided housings 11, 11, in particular, the end plates 21, 21 during welding of the divided housings 11, 11 through the joint surface 13, and a weld surplus elimination operation after the welding operation can be facilitated.

Suppose that the seal accommodation projections 22, 22 are provided to reach the joint surface 13, i.e., the end portions of the end plates 21, 21 without providing the end plates 21, 21 of the divided housings 11, 11 with the projection-free areas 23, 23. In this case, the welding operation of the end plates 21, 21 is complicated and the weld surplus elimination operation is made difficult. On the other hand, since this embodiment provides the projection-free areas 23, 23 between the seal accommodation projections 22, 22 of the divided housings 11, 11, the welding operation of the end plates 21, 21 and the weld surplus elimination operation after the welding operation can be facilitated.

An auxiliary projection device 25, which forms an additional seal accommodation space 36 between the auxiliary projection device 25 and the corresponding first pipe 1 or second pipe 2 as described below, is removably attached to the projection-free areas 23, 23 formed between the seal accommodation projections 22, 22 of the divided housings 11, 11.

The auxiliary projection device 25 has an auxiliary projection 26 fitted in the projection-free areas 23, 23 formed between the seal accommodation projections 22, 22 of the divided housings 11, 11, and an auxiliary fixing portion 27 for holding the auxiliary projection 26. The auxiliary projection 26 of the auxiliary projection device 25 forms the additional seal accommodation space 36 between the auxiliary projection device 25 and the first pipe 1 or the second pipe 2. The auxiliary fixing portion 27 is secured to the auxiliary projection 26 by an attachment bolt 28. The auxiliary projection device 25 as structured above is attached to the seal accommodation projection 22 of each divided housing 11, 11 by means of an attachment bolt 29 extending through the auxiliary fixing portion 27.

Figure 7:
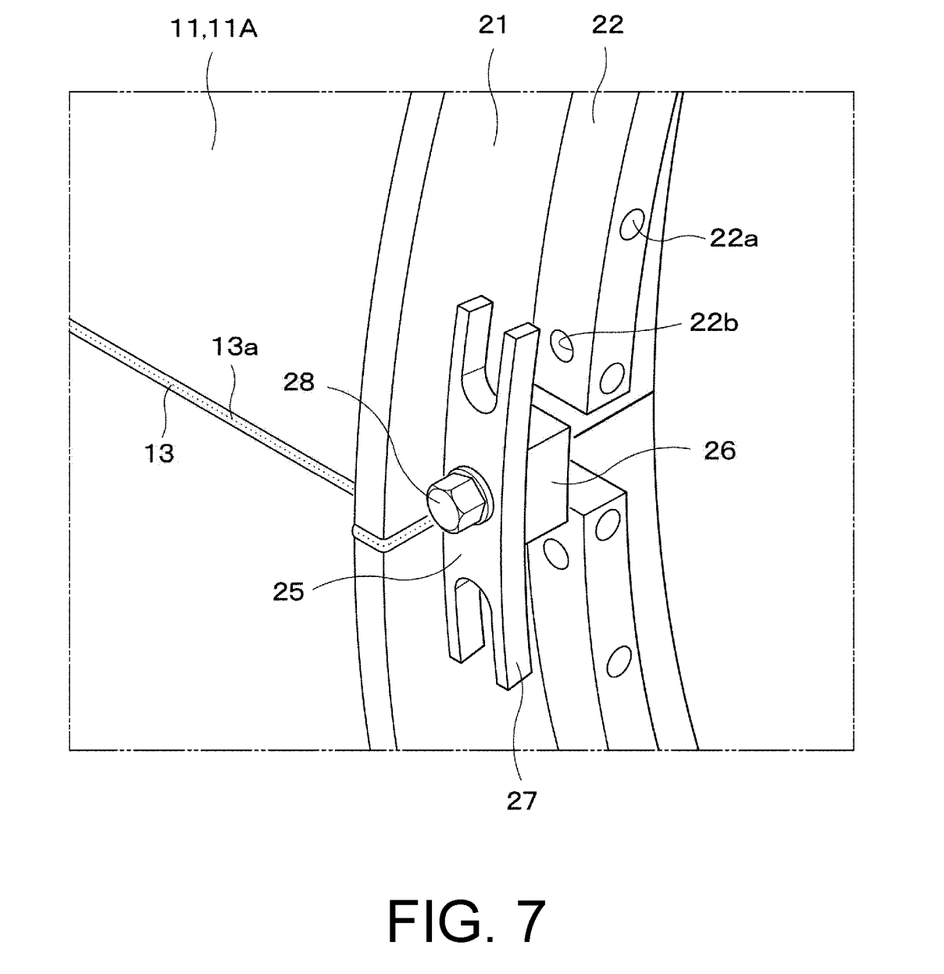
FIG. 7 is a view showing that an auxiliary projection device is provided on a projection-free area of the divided housings.
Figure 8:
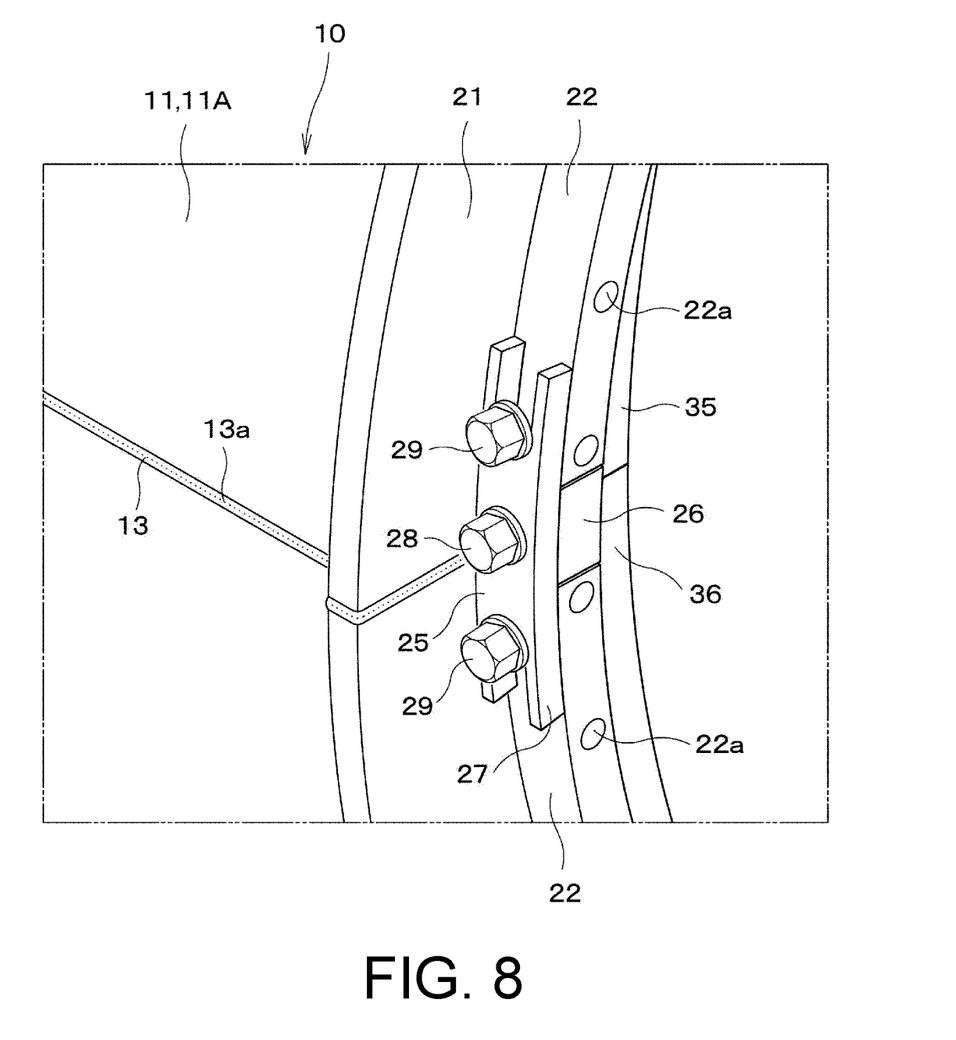
FIG. 8 is a view showing that the auxiliary projection device is fixed.

The attachment bolt 29 extending through the auxiliary fixing portion 27 of the auxiliary projection device 25 is inserted into an opening 22b formed in a radially outer surface of the seal accommodation projection 22 provided on each divided housing 11, 11 (see FIG. 7).

In FIGS. 5 to 8, an opening 22a is also formed in an axially outer surface of the seal accommodation projection 22, 22 provided on each divided housing 11, 11.

As described above, the seal accommodation projection 22, 22 provided on the divided housing 11, 11 forms the seal accommodation space 35 between the seal accommodation projections 22 and the first pipe 1 or the second pipe 2. In addition, the auxiliary projection device 25 forms the additional seal accommodation space 36 between the auxiliary projection device 25 and the first pipe 1 or the second pipe 2. The seal ring 30 is fitted in the seal accommodation space 35 and the additional seal accommodation space 36.

Next, the seal ring 30 attached in the seal accommodation space 35 and the additional seal accommodation space 36 is described. The seal ring 30 is made of elastic rubber and includes a pair of divided seal rings 31, 32 having a wedge shape. The divided seal rings 31, 32 are in contact with each other through inclined contact surfaces 30a.

The seal ring 30 is attached in the seal accommodation space 35 and the additional seal accommodation space 36, then a seal retainer ring fitting 24 is fitted in the seal accommodation space 35. Then, a bolt 38 is passed through the seal retainer ring fitting 24 via a bolt hole drilled in the seal retainer ring fitting 24. Thereafter, the bolt 38 is inserted and tightened into the opening 22a provided in the axially outer surface of the seal accommodation projection 22. At this time, the divided seal rings 31, 32 are axially compressed by the seal retainer ring fitting 24, and the divide seal rings 31, 32 are also radially moved by the inclined contact surfaces 30a. Thus, the seal ring 30 becomes in contact with the end plate 21, the seal accommodation projection 22, the auxiliary projection 26 of the auxiliary projection device 25, and the corresponding first pipe 1 or second pipe 2.

In this embodiment, an inclined angle (wedge angle) of the contact surface 30a between the divided seal rings 31, 32 is set at 45°, for example.

The repair joint device 10 in this embodiment hermetically seals, inside the repair joint device 10, a liquid leaked from the joint surface 3 between the first pipe 1 and the second pipe 2 to be repaired. The repair joint device 10 has an air port 47 in an upper end of the repair joint device 10, and a drainage port 48 in a lower end thereof. These ports are closed at the time of installation, and the inside of the repair joint device 10 is hermetically sealed after repair.

Figure 9:
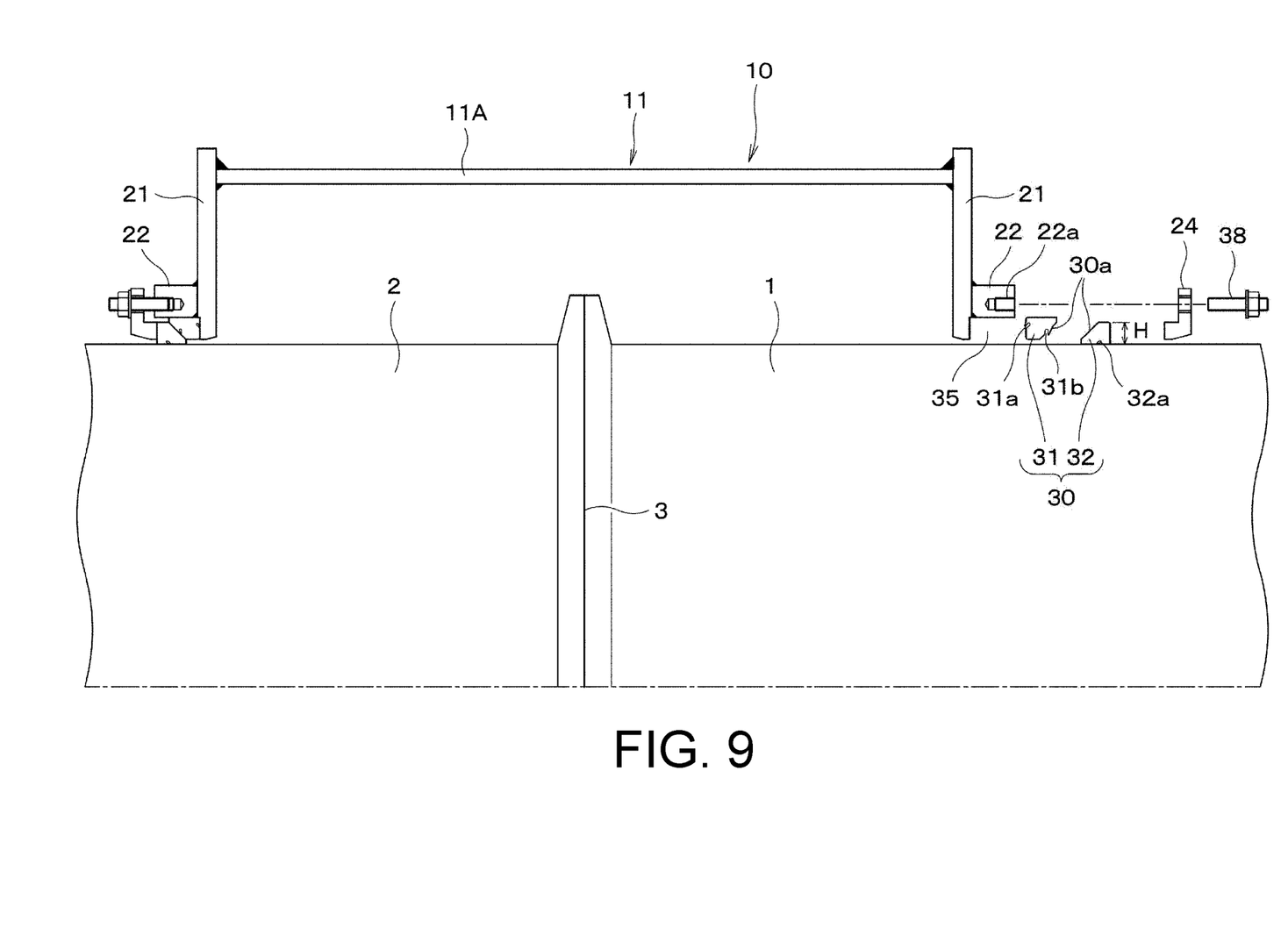
FIG. 9 is a view showing that a seal ring is fitted in the divided housing.

Next, the seal ring 30 is further described. FIG. 9 is a sectional view of a seal part during assemblage, with no axial pressure being applied to the divided seal rings 31, 32 constituting the seal ring 30. One of the opposed wedge-shaped divided seal rings 31, 32, i.e., the divided seal ring 31 has grooves 31a, 31b forming lips, which are respectively formed in an axially inner surface thereof and the contact surface 30a. The other divided seal ring 32 has a groove 32a forming a lip, which is formed in a bottom surface thereof. A height of the seal ring 30 is H. When a tightening force is axially applied, the divided seal rings 31, 32 are axially compressed and expanded radially outward so as to hermetically seal upper and lower seal surfaces of the seal accommodation space 35 and the additional seal accommodation space 36. When a tightening force is axially applied to the opposed contact surfaces 30a, the wedge-shaped contact surfaces 30a are axially compressed to radially move, so that the height of the seal ring 30 increases to further increase a seal pressure. The wedge angle of the seal ring 30 is formed at about 45°. Thus, the seal ring 30 can press the end plates 21 of the divided housings 11, 11 with a larger force, by axially compressing the seal ring 30. When the seal ring 30 is axially compressed, the seal ring 30 presses the seal accommodation projection 22, the auxiliary projection 26 of the auxiliary projection device 25, and the corresponding first pipe 1 or second pipe 2. Thus, the seal ring 30 can reliably seal the inside of the repair joint device 10 hermetically.

Next, a method of assembling the repair joint device as structured above is described with reference to FIGS. 3 to 9.

Figure 3:
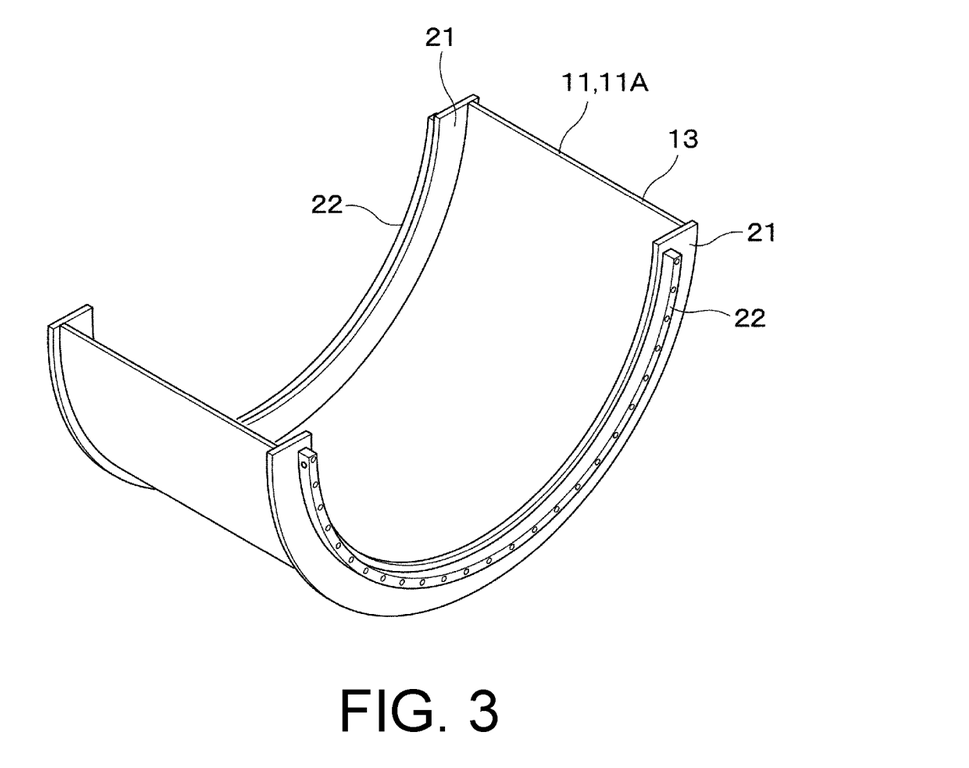
FIG. 3 is a perspective view showing a divided housing.

As shown in FIG. 3, a pair of the divided housings 11 are prepared first. Each divided housing 11 has the divided sleeve 11A surrounding the first pipe 1 and the second pipe 2 from the outside, a pair of the divided end plates 21, 21 provided on both axial end portions of the divided sleeve 11A, and the seal accommodation projection 22 provided on the axially outer surface of each end plate 21 to form the seal accommodation space 35 between the accommodation projections 22 and the first pipe 1 or the second pipe 2. The seal accommodation projection 22 on each divided housing 11 does not extend up to the joint surface 13 of the divided housing 11.

Figure 4:
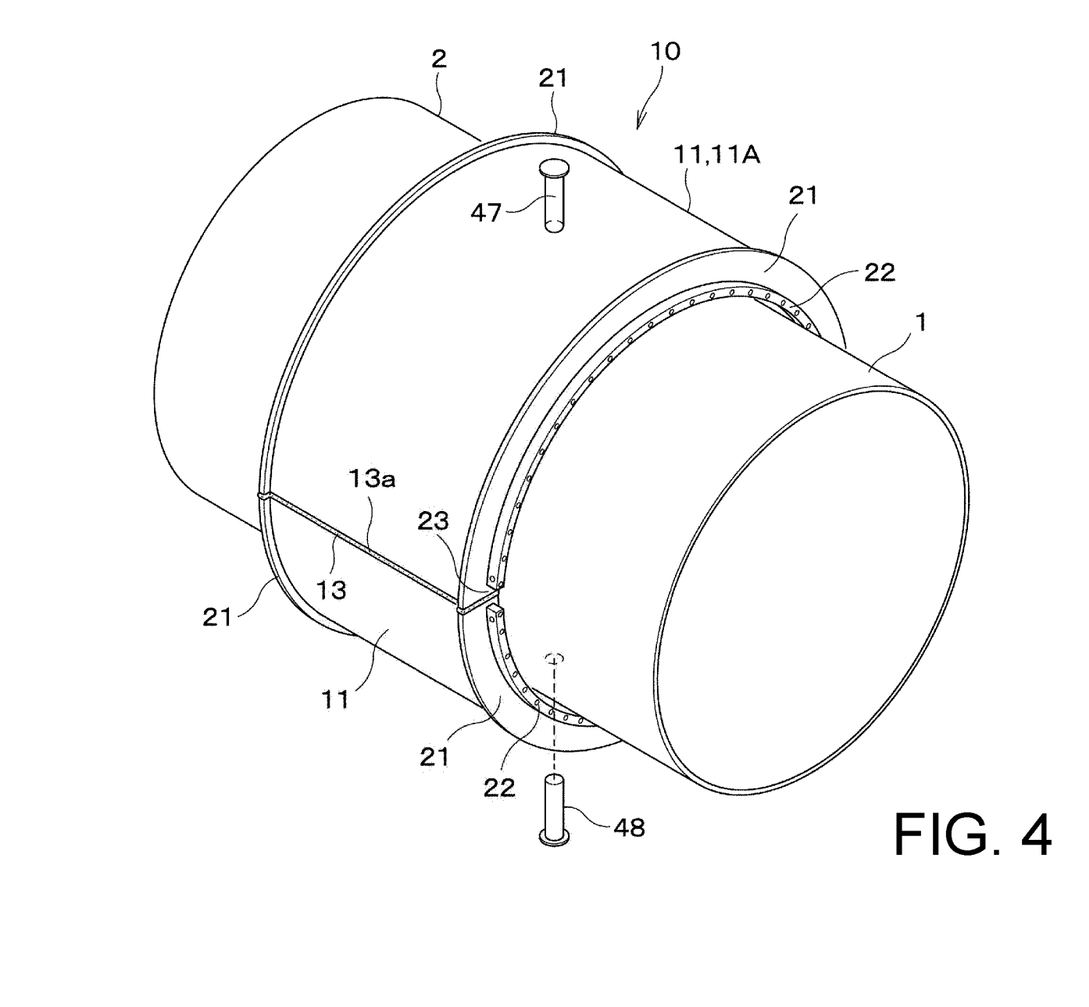
FIG. 4 is a perspective view showing a pair of divided housings which are located around a first pipe and a second pipe and are welded to each other.
Figure 5:
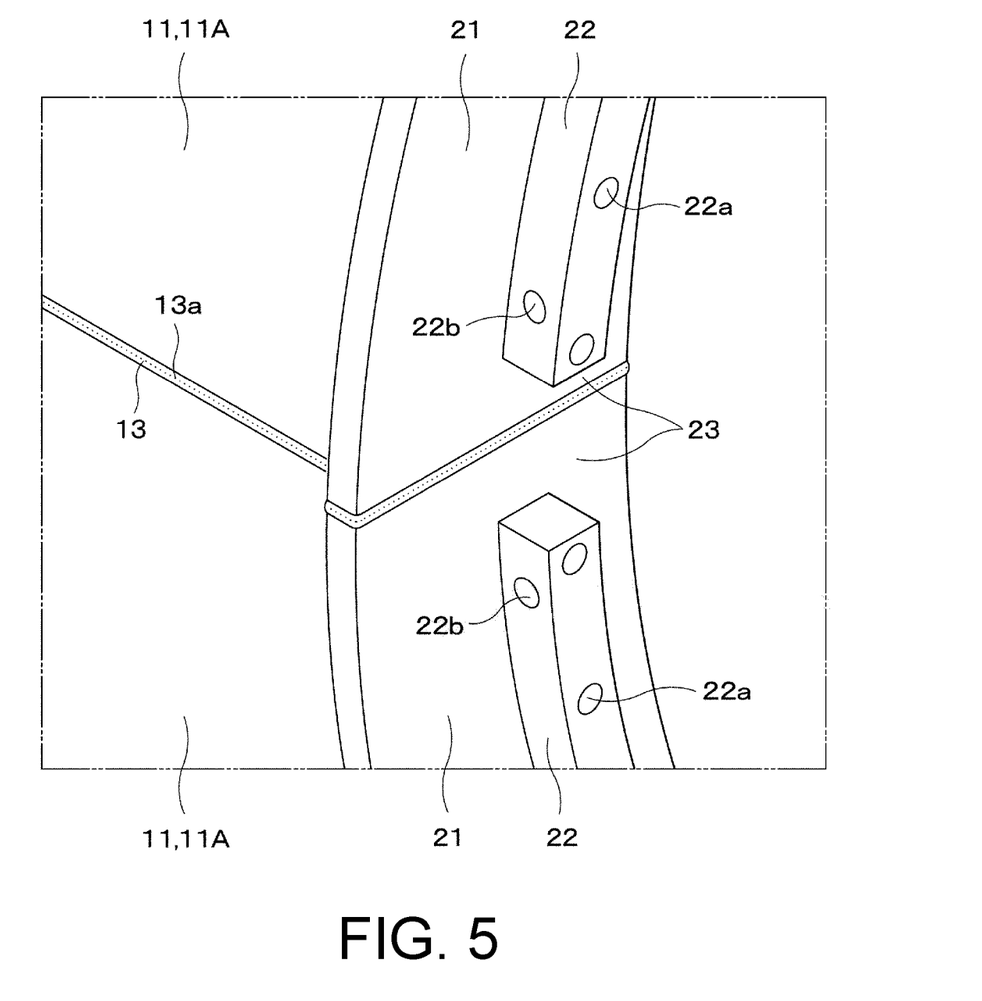
FIG. 5 is an enlarged view showing the divided housing shown in FIG. 4.

Then, as shown in FIGS. 4 and 5, the pair of divided housings 11 are placed around the first pipe and the second pipe. At this time, the projection-free areas 23, 23 are formed between the seal accommodation projection 22 of one of the pair of adjacent divided housings 11 and the seal accommodation projection 22 of the other divided housing 11. The projection-free areas 23, 23 formed between the seal accommodation projection 22 of the one divided housing 11 and the seal accommodation projection 22 of the other divided housing 11 comprise the projection-free area 23 of the one divided housing 11 and the projection-free area 23 of the other divided housing 11.

Thereafter, the pair of divided housings 11 are joined to each other by welding through the joint surface 13. At this time, a weld surplus 13a is formed along the joint surface 13 of the pair of divided housings 11 outside the joint surface 13. Since the projection-free areas 23, 23 are formed between the seal accommodation projections 22, 22 of the divided housings 11, 11, it is easy to perform the welding operation of the divided housings 11, 11, in particular, at portions of the end plates 21, 21 close to the seal accommodation projections 22, 22, as compared with a case in which the seal accommodation projections 22, 22 are provided to reach the joint surface 13.

Figure 6:
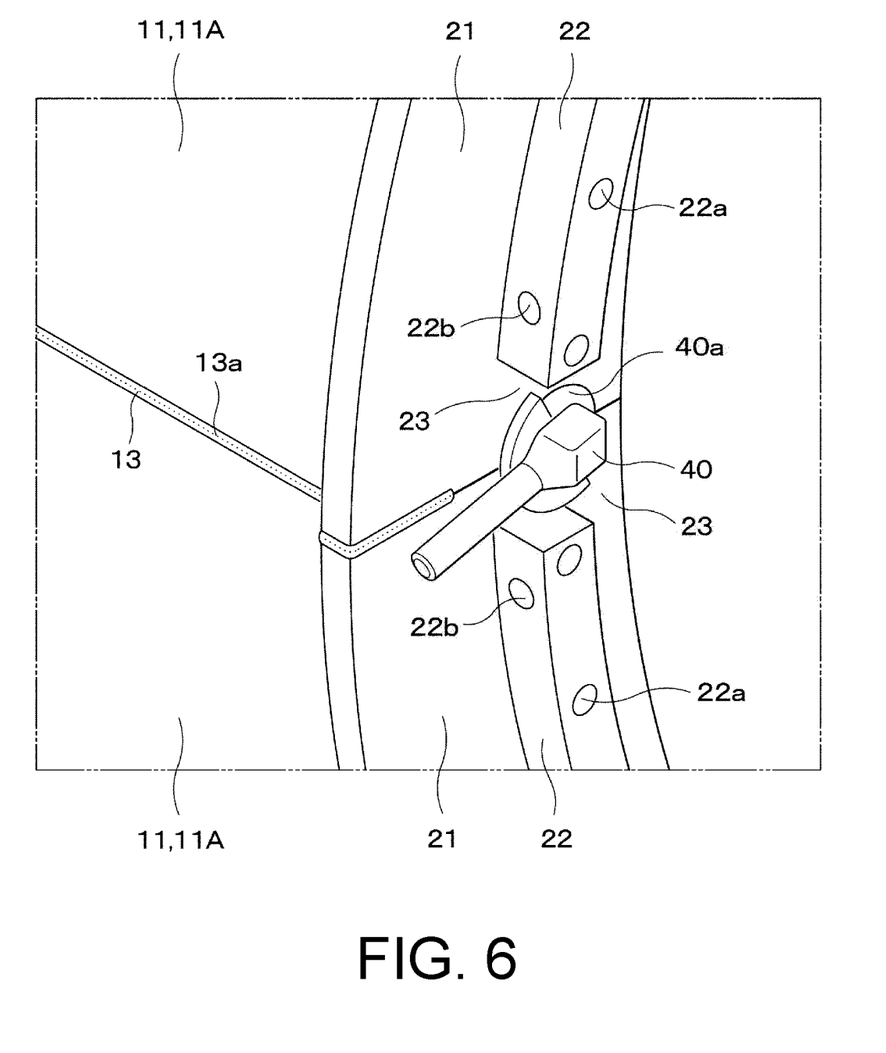
FIG. 6 is a view showing that a weld surplus of the divided housings is eliminated using a grinder.

Then, the weld surplus 13a remaining along the joint surface 13 of the pair of divided housings 11, 11, which are joined to each other by welding though the joint surface 13, is removed using a grinder 40 (see FIG. 6).

In this case, the weld surplus 13a, which remains on at least the projection-free areas 23, 23 of the end plates 22 and on a portion corresponding to the additional seal accommodation space 36, is removed by the grinder 40. Since the projections-free areas 23, 23 are formed between the seal accommodation projections 22, 22 of the pair of divided housings 11, 11, the weld surplus 13a on the joint surface 13 can be easily removed using the grinder 40, in particular, from the projection-free areas 23, 23 of the end plates 22 and from a portion corresponding to the additional seal accommodation space 36.

In this manner, the weld surplus 13a which remains on the projections-free areas 23, 23 between the seal accommodation projections 22, 22 on the end plates 21, and the weld surplus 13a which remains on a portion corresponding to the additional seal accommodation space 36, can be reliably removed using the grinder 40. This can smoothen the end plate 21 with which the auxiliary projection device 25 is contact, and the end plate 21 with which the seal ring 30 in the additional seal accommodation space 36 is contact. Thus, the sealing effect between the end plate 21 and the auxiliary projection device 25 and the sealing effect between the end plate 21 and the seal ring 30 can be improved, whereby the sealing performance of the repair joint device 10 can be improved using the seal ring 30.

The grinder 40 has a shape allowing its actuation part 40a to be inserted into the projection-free area 23, 23 between the seal accommodation projections 22, 22.

Thereafter, as shown in FIG. 7, the auxiliary projection device 25 for forming the additional seal accommodation space 36 between the auxiliary projection device 25 and the first pipe 1 or the second pipe 2 is attached to the projection-free areas 23, 23 between the seal accommodation projections 22, 22. Thus, the additional seal accommodation space 36 is formed between the auxiliary projection 26 of the auxiliary projection device 25 and the first pipe 1 or the second pipe 2.

Then, the attachment bolt 29 is provided through the auxiliary fixing portion 27 of the auxiliary projection device 25. By inserting each attachment bolt 29 into the opening 22b of the seal accommodation projection 22, 22, the auxiliary projection device 25 is fixed on the pair of divided housings 11, 11 (see FIG. 8).

Then, as shown in FIG. 9, the seal ring 30 is fitted in the seal accommodation space 35 and the additional seal accommodation space 36 of the pair of divided housings 11, 11. Thereafter, the seal retainer ring fitting 24 for holding the seal ring 30 is attached to the seal accommodation projection 22, and the bolt 38 is attached through the seal retainer ring fitting 24. The bolt 38 is then inserted into the opening 22a of the seal accommodation projection 22. By tightening the bolt 38, the seal ring 30 can be pressed along the axial direction by the seal retainer ring fitting 24.

Since the seal ring 30 is pressed along the axial direction, the seal ring 30 can be pushed to the end plate 21, the seal accommodation projection 22, the auxiliary projection device 25, and the first pipe 1 or second pipe 2. Thus, the inside of the repair joint device 10 can be hermetically sealed.

As described above, according to this embodiment, the seal accommodation projections 22, 22 of the pair of divided housings 11, 11 do not reach the joint surface 13, so that the projection-free areas 23, 23 are formed between the seal accommodation projections 22, 22 of the pair of divided housings 11, 11. Thus, a welding operation of the divided housings 11, 11 along the joint surface 13 can be easily and precisely performed, in particular, at the portions of the end plates 21, 21 close to the seal accommodation projections 22, 22, as compared with a case in which the seal accommodation projections 22, 22 reach the joint surface 13. In addition, the weld surplus 13a remaining along the joint surface 13, in particular, on the end plate 21 close to the seal accommodation projection 22, 22 can be easily removed after the welding operation.

In addition, the weld surplus 13a remaining on the projection-free areas 23, 23 formed between the seal accommodation projections 22, 22 of the pair of divided housings 11, 11 and remaining on a portion corresponding to the additional seal accommodation space 36 can be removed and smoothened using the grinder 40. Thus, the auxiliary projection device 25 can be tightly attached to the end plate 21 corresponding to the projection-free area 23, and the seal ring 30 in the additional seal accommodation space 36 can be reliably in contact with the end plate 21. Therefore, the sealing performance of the repair joint device 10 can be more improved using the seal ring 30.

1 First pipe
2 Second pipe
3 Joint surface
10 Repair joint device
11 Divided housing
11A Divided sleeve
13 Joint surface
13a Weld surplus
21 End plate
22 Seal accommodation projection
22a Opening
22b Opening
23 Projection-free area
24 Seal retainer ring fitting
25 Auxiliary projection device
26 Auxiliary projection
7 Auxiliary fixing portion
28 Attachment bolt
29 Attachment bolt
30 Seal ring
31a Contact surface
31 Divided seal ring
31a Groove
31b Groove
32 Divided seal ring
32a Groove
35 Seal accommodation space
36 Additional seal accommodation space
38 Bolt
40 Grinder
47 Air port
48 Drainage port

The invention claimed is:

1. A repair joint device comprising:
a plurality of circumferentially divided housings configured to surround a pipe, the divided housings being configured to be joined to each other by welding through a joint surface, wherein:
each divided housing comprises (i) a divided sleeve configured to partially surround the pipe, (ii) end plates provided respectively at axial end portions of the divided sleeve, and (iii) circumferentially extending seal accommodation projections provided respectively on axially outer surfaces of the end plates to form respective seal accommodation spaces between the seal accommodation projections and the pipe;
each seal accommodation projection does not extend to the joint surface;
projection-free areas are formed between the seal accommodation projections of one of the divided housings and the seal accommodation projections of another of the divided housings; and
an auxiliary projection device is removably provided at each of the projection-free areas, the auxiliary projection devices forming additional seal accommodation spaces between the auxiliary projection devices and the pipe.

2. The repair joint device according to claim 1, wherein each auxiliary projection device has an auxiliary projection configured to fit in a respective one of the projection-free areas, and an auxiliary fixing portion for holding the auxiliary projection, the auxiliary fixing portion being configured to be fixed on one of the seal accommodation projections of the one divided housing and one of the seal accommodation projections of the other divided housing.

3. The repair joint device according to claim 1, further comprising seal rings configured to fit respectively in the seal accommodation spaces and in the additional seal accommodation spaces, wherein
seal retainer ring fittings for holding the seal rings in the seal accommodation spaces and in the additional seal accommodation spaces are provided on the seal accommodation projections of each divided housing.

4. The repair joint device according to claim 3, wherein each seal ring includes a pair of divided seal rings that contact each other.

5. A method of assembling a repair joint device comprising a plurality of circumferentially divided housings configured to surround a pipe, the divided housings being configured to be joined to each other by welding through a joint surface, each divided housing comprising: (i) a divided sleeve configured to partially surround the pipe, (ii) end plates provided respectively at axial end portions of the divided sleeve, and (iii) circumferentially extending seal accommodation projections provided respectively on axially outer surfaces of the end plates to form respective seal accommodation spaces between the seal accommodation projections and the pipe, wherein the seal accommodation projections of each divided housing do not extend to the joint surface, the method comprising:
installing each divided housing around the pipe, wherein a projection-free area is formed between the seal accommodation projections of one of the divided housings and the seal accommodation projections of another of the divided housings;

joining the pair of divided housings by welding through the joint surface;

removing a weld surplus remaining on the joint surface of the pair of divided housings; and inserting an auxiliary projection device at each projection-free area, the auxiliary projection devices forming additional seal accommodation spaces between the auxiliary projection devices and the pipe.

6. The method of assembling a repair joint device according to claim 5, wherein the removing the weld surplus comprises removing a weld surplus remaining at least on portions corresponding to the projection-free areas and the additional seal accommodation spaces of the joint surface of the divided housings, prior to inserting the auxiliary projection devices.

7. The method of assembling a repair joint device according to claim 6, further comprising fitting seal ring in each seal accommodation space and each additional seal accommodation space, and attaching a seal retainer ring fitting for holding the seal ring on the seal accommodation projection.

8. The repair joint device according to claim 2, further comprising seal rings configured to fit respectively in the seal accommodation spaces and in the additional seal accommodation spaces, wherein seal retainer ring fittings for holding the seal rings in the seal accommodation spaces and in the additional seal accommodation spaces are provided on the seal accommodation projections of each divided housing.

9. The repair joint device according to claim 8, wherein each seal ring includes a pair of divided seal rings that contact each other.

10. The method of assembling a repair joint device according to claim 5, further comprising fitting a seal rings in the seal accommodation spaces and the additional seal accommodation spaces, and attaching seal retainer ring fittings for holding the seal rings in the seal accommodation projections.

* * * * *